March 8, 1932. J. SCHMIDT 1,848,225
APPARATUS FOR TREATING FOOD PRODUCTS
Filed Dec. 15, 1927  2 Sheets-Sheet 1

March 8, 1932.　　　　J. SCHMIDT　　　　1,848,225
APPARATUS FOR TREATING FOOD PRODUCTS
Filed Dec. 15, 1927　　2 Sheets-Sheet 2

Inventor:
John Schmidt

Patented Mar. 8, 1932

1,848,225

UNITED STATES PATENT OFFICE

JOHN SCHMIDT, OF HOOPESTON, ILLINOIS, ASSIGNOR TO SPRAGUE SELLS CORPORATION, OF HOOPESTON, ILLINOIS

APPARATUS FOR TREATING FOOD PRODUCTS

Application filed December 15, 1927. Serial No. 240,227.

This invention relates to a machine for pulping such materials as pumpkin, tomato, celery, asparagus and in fact any food product that requires maceration in its preparation for canning purposes.

In the pulping of material for canning or other purposes it is highly desirable that complete control of the material while passing through the machine, is had by the operator, so that the time in which it is treated may be regulated to suit the requirements of the particular material being handled, to thereby give it a longer or shorter treatment according to the fibrous or other inherent nature in the material. Some materials need a preliminary cutting or crushing treatment before reaching the pulping part of the apparatus in order to bring the material into small enough particles to be acted on properly and efficiently by the pulping mechanism. Other materials require this preliminary crushing and in addition require to be cut into small pieces to destroy the fibrous character of the material such for instance as asparagus and celery.

The complete unitary apparatus provided by this invention provides means for accomplishing all of the above mentioned requisites for a machine of this type, through the provision of mechanism that is simple and highly efficient in operation.

It is therefore a principal object of this invention to provide a pulping machine having means for controlling the time movement of material therethrough so as to give proper pulping action to a wide variety of materials.

It is also an object of the invention to provide means in a pulping machine for food products for giving a preliminary crushing and cutting operation to materials being handled.

It is also an object of the invention to provide means for cutting material of a fibrous nature so that the material will pass to the pulping mechanism in small pieces adapted to be easily operated upon by the pulper mechanism.

It is also an object of the invention to provide means for admitting material to the apparatus from either side as a matter of convenience for the canner.

It is also an object of the invention to provide a pulping mechanism that will tend to turn the material while moving it along the pulping screen.

With such objects in view as well as other advantages which may be inherent in the invention, consisting in the parts and combinations hereinafter set forth and claimed, it is understood that the several necessary elements and combinations constituting the same may be varied in their proportions, placement and general arrangement without departing from the scope and nature of the invention.

In order to make the invention more clearly understood, there are shown, somewhat diagrammatically, in the accompanying drawings means and mechanism for placing the same in concrete form, without limiting the improvements in their applications to the particular construction chosen to illustrate the invention.

By reference now to the drawings a better and clearer understanding of the invention will be had.

Figure 1:
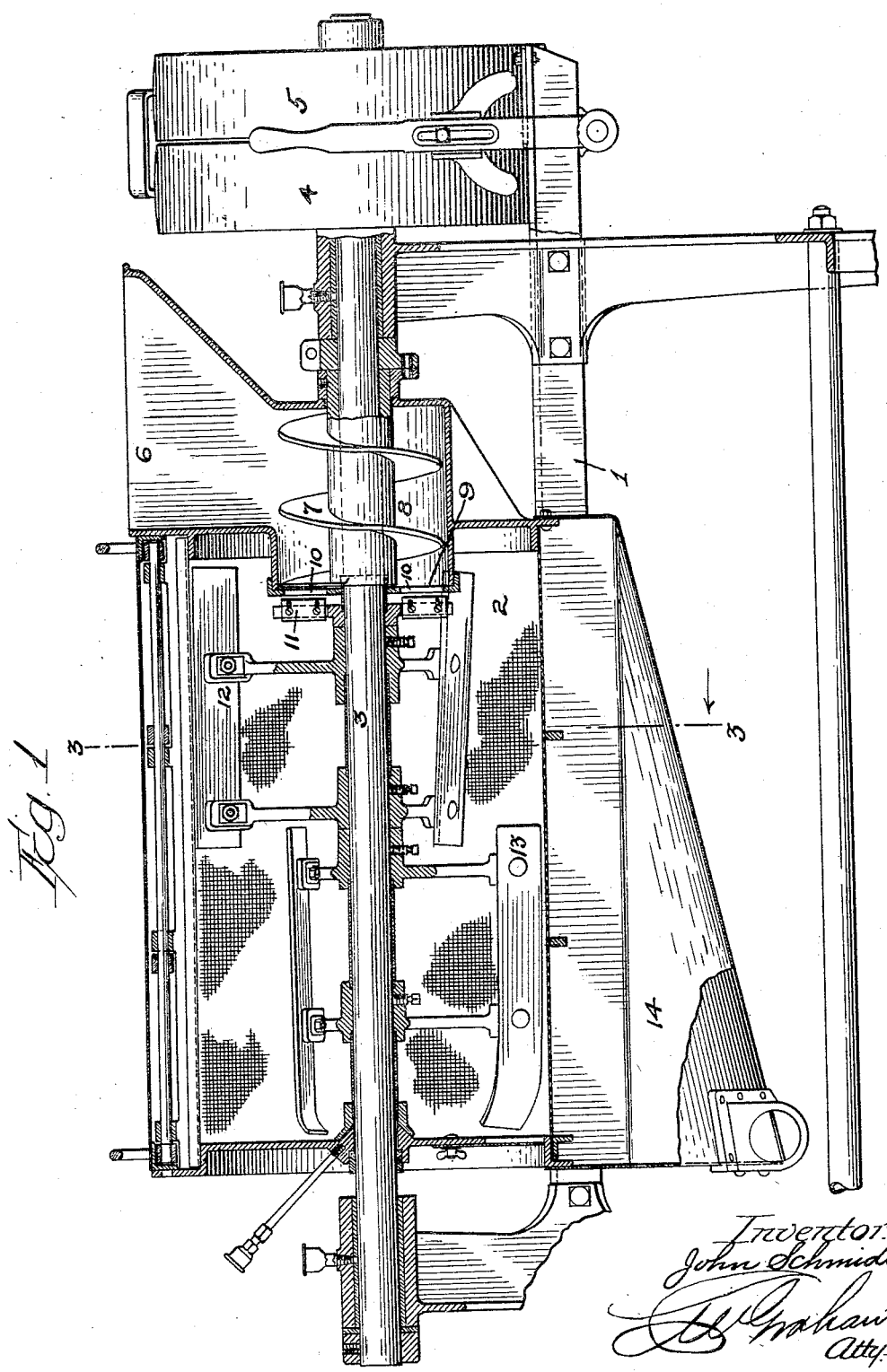
Fig. 1 represents a vertical sectional elevation through the longitudinal axis of the machine. This view clearly shows the preliminary crushing and cutting apparatus and clearly shows the arrangement of the pulping reels and how they are divided to provide means of controlling the flow of material through the screen.
Figure 2:
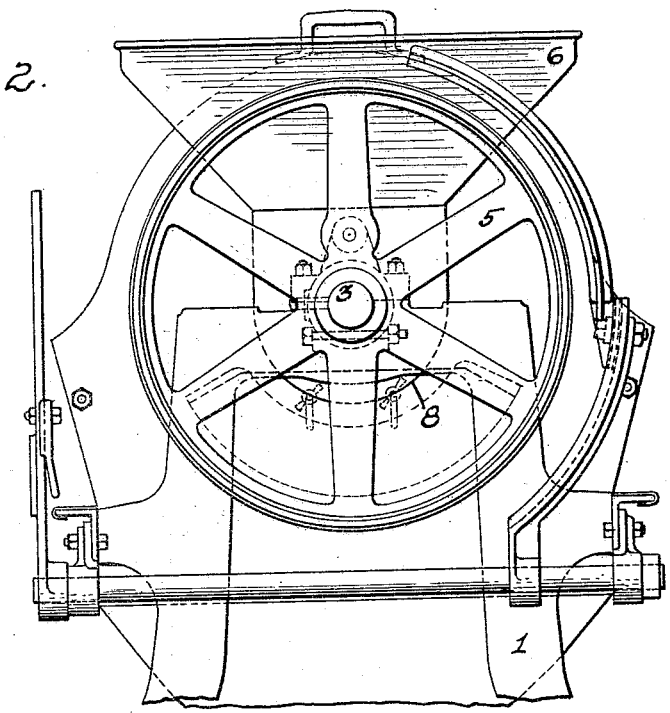
Fig. 2 is an end elevation looking from the right end of Fig. 1.
Figure 3:
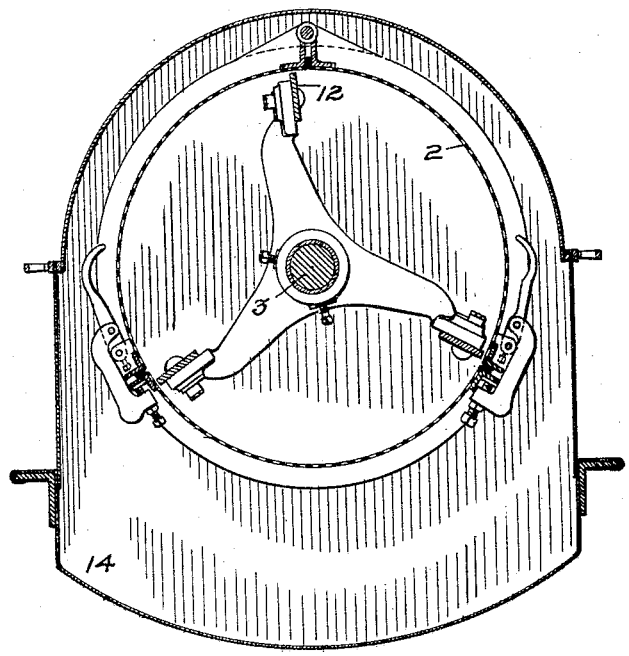
Fig. 3 is a cross sectional elevation taken on approximately the line 3—3 of Fig. 1.

1 represents a general frame work on which the operative apparatus is mounted. 2 is the pulping screen member mounted on and carried by suitable heads and clamping members. 3 is the central driving shaft which operates all of the elements constituting the pulper. 4 and 5 are tight and loose pulleys for turning the shaft, and receive their motions from a suitable belt not shown. 6 is a feed hopper that is provided with a diverging mouth that extends outward toward opposite sides of the machine to facilitate placing material therein from either side as a matter of convenience. 7 is a screw feed element housed in a chamber 8 forming a bottom of the feed hopper 6. 9 is a crusher head obstructing the opening from the chamber 8 into the screen chamber 2. This crusher head has a series of holes through which the material is forced by the screw 7 to reduce it to a condition that will tend to more perfect pulping, these holes are designated by the numeral 10. Just inside of the crusher head 9 is a rotary cutter head 11 having a series of knives located in close relation to the crusher head 9 so as to cut any fibrous material into small pieces to facilitate pulping. For material that does not need cutting the knives are removed or adjusted away from the crusher head. There are two pulping reels in the screen section designated by 12 and 13, each having substantially equally spaced pulping blades as is shown in Fig. 3. These may be solid blades as shown or brushes for softer materials. Underneath the screen member 2 is arranged a receiving chamber 14 into which all of the material passes that gets through the screen 2.

Operation

Materials to be treated are dumped by hand or by suitable conveying means not shown, into the hopper 6 from either side of the machine, this material drops onto the feed screw 7 and is gradually forced against the crushing head 9 which action macerates most materials so that they squeeze through the holes 10 in the crusher head where they are met by the cutter head 11 which cuts the material into small pieces if it is of a fibrous nature. From here it drops into the screen member 2 and is immediately picked up by the reel 12 and carried around by the reel blades in contact with the screen surface which action squeezes more or less of the material through the screen mesh from which it drops into the receiver chamber 14. As the material is moved around the screen 2 it is also carried along the screen surface axially of the screen at a speed that is governed by the pitch of the reel blades. While being moved in this manner the material is supposed to roll over and over so that all of it will come into contact with the screen surface and that, which is desired will be squeezed through the screen. This theory does not work out in practice as I have found by building many of the regular types of pulpers. Many materials instead of rolling over and over as is necessary to get effective operation, simply slide around on the surface of the screen so that the lower part of the mass in front of each blade is the only part that is being subjected to screen action, that forming the top of the mass sometimes never reaching the screen, therefore I have never had efficient pulping action in the ordinary type of pulpers, since I had no way of breaking up the mass of material in front of the reel blades to bring other portions of the mass into contact with the screen. By using two reels in tandem, however as I have done in this invention the foregoing trouble has been almost entirely eliminated. When the material passes from the end of the first reel into contact with the end of the second reel it is most completely turned over and new surfaces of the mass of material are subjected to the screening action. For purpose of illustration in the drawings I have shown only two reel sections, which are sufficient for some materials that are easily mixed. I want it understood that I intend to use as many reel sections in any unitary apparatus as are found necessary to properly turn the material to get the most efficient operation, or to control the time of passing through the screen member. By having reel members operating in tandem relation I am able by changing the pitch of the reel blades to make the material move fast or slow as may be desired. I may have one reel arranged to move the material slow and the next one to move it fast, and the next to move it slow again, or I can arrange the pitch of the blades to give any component of movement desired for any kind of material being handled. In order to get some relatively hard and fibrous material through the screen it may be necessary to move it very slowly axially but subject it to many revolutions in contact with the screen, while other softer and more liquid materials would require a fast axial speed and many less revolutions around the screen surface. This manner of controlling the axial movement of the material relative to the rotary movement and the turning of the mass of material each time it passes from one reel to the next in line gives such a graduated control of the operation that almost any material that is pulped can be most efficiently handled.

The reel blades in the drawings do not show very much pitch but this is of no importance in illustrating the invention. The spiders on which the reel blades are attached are adjusted on the shaft by set screws, or any other well known means and can easily be adjusted to whatever angle may be desired by the operator, and since apparatus will be constructed with as many reel sections as are necessary to handle any material, adjustments can be made to suit any operating conditions.

It will also be noted that the adjacent ends of the reel members overlap slightly. This overlap may be made more or less as may be required. This overlap is important in getting a proper turnover of the material as it passes from one reel section to the other, and of course as many turn overs as may be desired may be obtained by multiplying the reel sections.

What I claim as new and desire to secure by Letters Patent is:

1. In an apparatus for pulping and crushing food materials comprising a rotary screw for feeding materials, a macerating device through which said materials are forced by said screw, a screen member for receiving said material, a plurality of reel members for beating said material against said screen member, said reel members having overlapping ends to cause a turning of said material when passing from one to the other.

2. An apparatus for treating food products comprising a screened chamber for receiving a product to be treated, a plurality of movable members located within said screened member and being positioned in tandem relation with the ends of adjacent members overlapping, means for imparting movement to said members to thereby produce both axial and rotary movement to a mass of material, means for adjusting the said movable members relative to the said screened member to thereby vary the relative speed of movement of said material axially of said screened member.

3. An apparatus for treating food materials comprising a feed device, a macerating or crushing device and a cutting member, reel members and a perforate casing in which said reel members are positioned, a drive shaft on which said feed device, cutting device and reel members are mounted, means on said shaft for imparting movement thereto, means securing said reel members on said shaft whereby they may be given adjustment to change their angularity to thereby regulate the movement of material along and through said perforate screen, all of said reel members being in some angular adjustment and all being independently adjustable.

4. An apparatus for pulping food materials comprising a cylindrical perforate casing, an operating shaft extending axially through said casing, a material feed device a cutting device and a plurality of reel members mounted on said shaft, the positioning of said reel members on said shaft being such that the blade members overlap at their adjacent ends, securing means for maintaining the reel members in a desired adjustment relative to said shaft whereby the angularity of the reel members may be changed to suit different materials and to regulate the speed of travel of the material along and through the perforations of said screen member, all of said plurality of screen members being adjusted at some angularity relative to said shaft and each of said plurality of reel members being adjustable independent of any other reel member.

5. A fruit juice expressing device comprising a cylinder, a portion of the wall of which is perforate, a shaft journaled in said cylinder, a perforate plate intermediate the length of said cylinder, a hopper to feed material to said cylinder adjacent one end, a hopper adjacent the other end thereof to discharge expressed material, a screw member beneath said feed hopper and extending from one end of said cylinder to said perforate plate, paddles of relatively slight pitch midway said cylinder, and paddles of greater pitch than that of the first mentioned paddles coextensive with said discharge hopper and at their ends overlapping the ends of said first mentioned paddles, said screw and paddles advancing fruit from one end of said cylinder to the other with increasing speed as the discharge hopper is approached.

In testimony whereof I affix my signature.

JOHN SCHMIDT.